United States Patent [19]
Janssen et al.

[11] 3,907,813
[45] Sept. 23, 1975

[54] STEREOISOMERIC FORMS OF 4-ANILINO-3-METHYL PIPERIDINES

[75] Inventors: Paul Adriaan Jan Janssen, Vosselaar (Turnhout); Willem Florent Maria Van Bever; Raymond Antoine Stokbroekx, both of Beerse, all of Belgium

[73] Assignee: Janssen Pharmaceutica N.V., Beerse, Belgium

[22] Filed: Sept. 30, 1974

[21] Appl. No.: 510,268

Related U.S. Application Data

[62] Division of Ser. No. 396,277, Sept. 11, 1973, abandoned.

[52] U.S. Cl. ...... 260/293.79; 424/267; 260/293.77; 260/293.8; 260/293.88
[51] Int. Cl.² .......................................... C07D 211/58

[58] Field of Search .................... 260/293.79, 293.8

[56] References Cited
UNITED STATES PATENTS
3,438,991  4/1969  Janssen ............................ 260/293.8
3,821,231  6/1974  Lavrinovich et al ........... 260/293.79

OTHER PUBLICATIONS
J. Pharm. Sci., 62:983–986, (1973), Riley et al.

Primary Examiner—Sherman D. Winters
Attorney, Agent, or Firm—Salvatore R. Conte

[57] ABSTRACT

Certain stereoisomers of N-(3-methyl-1-phenethyl-4-piperidyl)propionanilide having very potent analgesic actitivy, methods of preparing same and novel precursors therefor.

13 Claims, No Drawings

STEREOISOMERIC FORMS OF 4-ANILINO-3-METHYL PIPERIDINES

CROSS-REFERENCE TO RELATED APPLICATION

This is a divisional application of my co-pending application Ser. No. 396,277, filed Sept. 11, 1973, and now abandoned.

BACKGROUND OF THE INVENTION

The invention pertains to the field of N-(1-phenethyl-4-piperidyl)propionanilides having a methyl group in the 3-position of the piperidine ring, and, more particularly, to certain geometric and optical isomers thereof. Prior art compounds unsubstituted in the 3-position of the piperidine ring, are described in U.S. Pat. No. 3,164,600. Methyl substitution in the 3-position is described in J. Pharm. Sci., 62, 983 (1973), although no specific preparation or isolation of inherent isomeric components from the optically inactive parent mixture is given. This invention provides for the preparation and isolation of certain such isomeric components, novel compositions thereof and novel precursors therefor.

SUMMARY OF THE INVENTION

There is provided by this invention certain geometric and optical isomers of N-(3-methyl-1-phenethyl-4-piperidyl)propionanilide, which isomers, in base or acid addition salt form, have significantly higher analgesic activity, for example, from about 2–16 times higher potency, based on the weight of base administered, than the prior art compounds disclosed in said U.S. Pat. No. 3,164,600, including the commercially available compound, N-(1-phenethyl-4-piperidyl)propionanilide, also known by its generic name "fentanyl." The isomeric forms of this invention may be used in base form or, more conveniently, in acid addition salt form, either alone or in combination with other therapeutically active agents in analgesia.

DESCRIPTION OF THE PREFERRED EMBODIMENTS

The compounds of this invention are certain geometric and optical isomers of N-(3-methyl-1-phenethyl-4-piperidyl)propionanilide (Formula I):

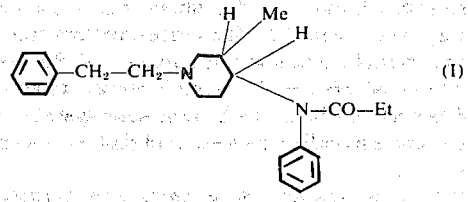

For purposes of this invention, (I) is characterized by the symbol (±), denoting a racemic mixture (optically inactive) of stereoisomers, due to substituents in the 3- and 4-positions of the piperidine ring, two geometrical configurations of (I), and the precursors therefor are possible in which the 3-methyl group is in a position cis or trans to the functional group in the 4-position. The term "cis" is applicable to that configuration in which the two functional groups lie on the same side of the plane of the ring; and the term "trans" is applicable when the two groups lie on opposite sides of the plane.

In addition to geometric isomerism, each of the cis and trans geometric forms can also occur in the form of optically active dextro (+) and levo (−) isomers (enantiomers) due to the lack of symmetry occassioned by the asymmetric carbons at the 3- and 4-positions of the piperidine ring. As used herein, the optical rotation symbol (+) or (−) is an expression of the total rotatory power of the whole molecule corresponding to the sum of the contributions of each such asymmetric carbon atom.

According to this invention, there is provided a method of synthesizing the geometric isomers (cis and trans) of (I) and the optically active (+(−and −) forms of such geometric isomers.

The geometric cis and trans isomers of (I) can be prepared by a series of reactions beginning with an initial separation into the corresponding cis and trans geometric isomers of an appropriate 4-anilido-3-methyl-piperidinecarboxylate (II) of the following formula:

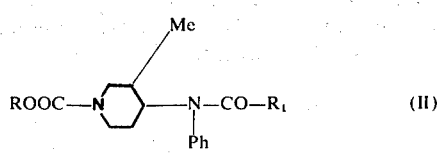

wherein R and $R_1$ each represent a member selected from the group consisting of loweralkyl (1–6 carbons) and aralkyl, e.g., a phenylloweralkyl such as, benzyl, phenethyl and the like. Such separation can be accomplished by fractional crystallization techniques employing a suitable ether-alcohol mixture, preferably a mixture of from about 1:3 to about 3:1 parts by volume of a dialkyl ether and isopropanol. A solution of (II) in such mixture (warmed sufficiently to provide maximum solubility) is permitted to cool slowly to ambient temperatures (below 35°C), whereupon a precipitate of the cis-(±) isomer of (II), free or substantially free of the contaminating trans-(±)isomer, is obtained. Further cooling of the filtrate (e.g., down to 10°C or below yields the trans-(±)isomer of (II), free or substantially free of the contaminating cis-(±)-isomers, as a second precipitate.

Each of the thus-obtained cis-(±)and trans-(±)isomers of (II) may be used as precursors for the preparation of the corresponding cis and trans isomers of (I). using the former for purposes of exemplification, cis-(±)-4-(N-phenylamido)piperidine carboxylate (cis-II) is converted to the corresponding cis-(±)-4-anilino-3-methylpiperidine (cis-III) by acid or alkaline hydrolysis, for example, by treatment of (cis-II) with a large molar excess of concentrated (48%) HBr solution, preferably under reflux. After the reaction is complete, the excess acid is neutralized with a suitable base, such as, for example, an alkali metal or alkaline earth metal hyroxide, ammonium hydroxide and the like, and the cis-(±)-4-anilino-piperadine product (cis-III) is extracted with a suitable organic solvent, such as, for example, an aromatic hydrocarbon (e.g., benzene, toluene, xylene and the like), a halogenated loweralkane (e.g., chloroform, methylenechloride and the like), etc. and isolated by conventional techniques. Condensation of (cis-III) with an equivalent amount of a reactive ester of phenethylalcohol, such as, halide, sulfonates and the like, preferably Ph—$CH_2$—$CH_2$—X, wherein X is halo, preferably chloro or bromo, or a radical of formula $OSO_2R_2$, wherein $R_2$ represents a loweralkyl(-1–6C) or p-tolyl, yields the corresponding cis-(±)-4-anilino-3-methyl-1-phenethylpiperidine(cis-IV). The reaction, preferably under reflux, is carried out in an inert organic solvent, such as, for example, an aromatic hydrocarbon (e.g., benzene, toluene, xylene and the like), a lower alkanone (e.g., 4-methyl-2-pentanone), and the like. The presence of a suitable base, such as, for example, sodium carbonate, is desirable to neutralize the acid (HX) produced during the course of the reaction. The addition of a small amount of potassium iodide may also be added to the reactants when X is halo. The thus-obtained (cis-IV) is then acylated with an appropriate acylating agent, e.g., propionic acid anhydride or halide under standard acylation conditions to yield the desired product (cis-I). Mechanical recovery (e.g., filtration) and standard purification techniques (e.g., recrystallization) of the product offers the essentially pure geometric cis isomer which is free or substantially free of the contaminating trans isomer. The foregoing reaction scheme, which is similarly applicable to the formation of the corresponding trans-(±)isomer, may be illustrated as follows:

kanone (1–6 carbons), preferably dimethyl ketone, to heated solutions of said salts till turbidity occurs, results in the crystallization out of solution, as the temperature is lowered below approximately 35°C, of the (+)-tartrate salt of cis-(−)-4-anilino-3-methylpiperidine while the cis-(+) salt stays in solution. Mechanical recovery (e.g., filtration) of the (+)-acid cis(−)-base salt offers an essentially optically pure product which is free or substantially free of contaminating (+)-acid cis-(+)-base salt.

The mother liquor is concentrated, for example, by evaporation in vacuo, and an aqueous solution of the residue is treated with alkali, for example, an alkali metal or alkaline earth metal hydroxide or ammonium hydroxide, to neutralize the acid that is present. Extraction of the cis-(+)-4-anilino-3-methyl piperidine base is accomplished with chloroform. The chloroform extract is then dried and evaporated and the resultant residue of cis-(+) base is treated with (−)-tartaric acid using a lower alkanol and lower alkanone according to the procedure previously described with (+)-tartaric acid. As the temperature of this solution is lowered below approximately 35°C, the (−)-tartrate salt of cis-(−)-4-

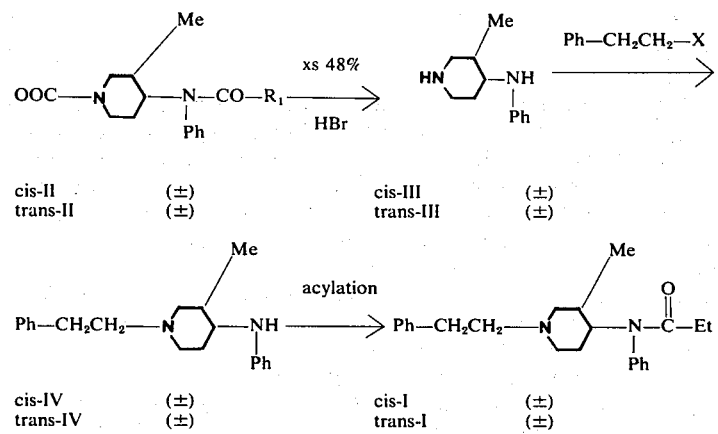

Attempts to resolve the aforementioned geometric cis-(±)and trans-(±)isomers of formula (I) into their respective dextro and levo optical isomers by conventional resolution and isolation techniques have not been successful. It has now been found that such optical isomers may be obtained by the synthesis hereinafter described. This synthetic approach is based on an initial resolution of certain novel precursors described in the preparation of the aforementioned geometric isomers, namely, the (±)-4-anilino-3-methyl-piperidines of formula(cis-III)and (trans-III).

It has been found that said geometric (cis-III)-(±)-isomer may be resolved by treatment with optically active forms of tartaric acid. At temperatures above approximately 45°C both the dextro and levo 4-anilino-3-methyl-piperidines form salts with (+)-tartaric acid which are extremely soluble in lower alkanols (1–6 carbons), preferably methanol, so that minimal amount of alkanol need be employed. The addition of a lower alanilino-3-methylpiperidine crystallizes out and is isolated. Said (−)-acid cis-(+)-base salt is essentially optically pure and is free or substantially free of contaminating (−)-acid cis-(−)-base salt.

The cis-(−)-4-anilino-3-methylpiperidine (+)-tartrate and the cis-(+)-4-anilino-3-methylpiperidine (−)-tartrate salts obtained by the above resolution procedure may be converted to the corresponding free base by conventional treatment with alkali, and the respective cis(−)-and cis-(+)-4-anilino-3-methyl piperidines thus obtained may be utilized in the subsequent synthesis of the corresponding cis-(−)- and cis-(+)-isomers of formula (I).

Such synthesis comprises the steps, as previously described in the preparation of the geometric isomers, of condensation with phenethyl halide and subsequent acylation with propionic acid anhydride or halide.

The foregoing reaction scheme may be illustrated as follows:

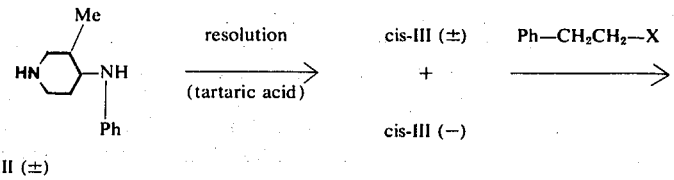

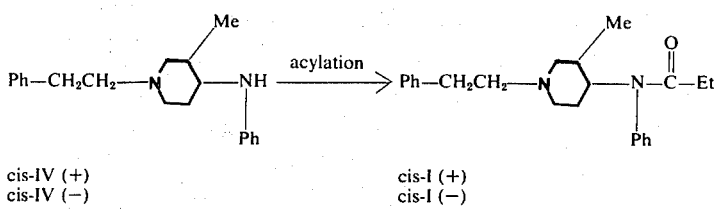

cis-IV (+)                cis-I (+)
cis-IV (−)                cis-I (−)

For simplicity the foregoing process has been described for the preparation of cis-(+)-and cis(−)-isomers of formulas (I). The process can be operated in exactly the same way for the formation of the corresponding trans-(+)-and trans-(−)-isomers of formula (I), except that initial resolution of the geometric (trans-III)-(±)-isomer, rather than the (cis-III)-(±)-isomer, with optically active forms of tartaric acid is required.

Accordingly, there are obtained the trans-(−)-4-anilino3-methyl piperidine (+)-tartrate and trans-(+)-4-anilino-3-methyl piperidine (−)-tartrate salts, which upon treatment with suitable base, yield the corresponding free base forms.

The formula II precursors may be obtained by treating an appropriate 4-piperidone of formula(II-a), wherein R is a member selected from the group consisting of loweralkyl and aralkyl, with aniline to form the Schiff base(II-b) which is then subjected to reduction, for example, with sodium borohydride, to yield the 4-anilino product (II-c) which in turn is acylated with an appropriate acylating agent, e.g., a lower alkanoic acid or aralkanoic acid anhydride or halide, under acylating conditions familiar to those skilled in the art to yield the desired precursor (II). The reaction scheme may be illustrated as follows:

Arzneimittel-Forschung, 13, 502 (1963); 21, 862 (1971), the subject compounds demonstrate, as exemplified in Table I, an increase in potency of from 2 to 16 times, as compared against the prototype of the prior art, fentanyl.

TABLE 1

| Compound | $ED_{50}$* (wg/kg i.v.) | Potency Ratio | Duration (mins.) |
|---|---|---|---|
| A. fentanyl | 0.02 | (1) | 42 |
| B. cis-(±) | 0.0025 | 8 | 95 |
| C. trans-(±) | 0.01 | 2 | 40 |
| D. cis-(+) | 0.00125 | 16 | 86 |

*As function of weight of base
A. = N-(1-phenethyl-4-piperidyl)propionanilide.
B. = cis-(±)-N-(3-methyl-1-phenethyl-4-piperidyl)propionanilide oxalate
C. = trans-(±)-N-(3-methyl-1-phenethyl-4-piperidyl)propionanilide oxalate
D. = cis-(+)-N-(3-methyl-1-phenethyl-4-piperidyl)propionanilide nitrate isopropyl alcoholate The preferred isomeric forms are the cis isomers, namely, the cis-(±)- and cis-(+)-forms of N-(3-methyl-1-phenethyl-4-piperidyl) propionanilide, the latter being most preferred in view of its very marked and surprisingly potent analgesic activity.

In view of their useful analgesic activity, the subject compounds may be formulated into various pharma-

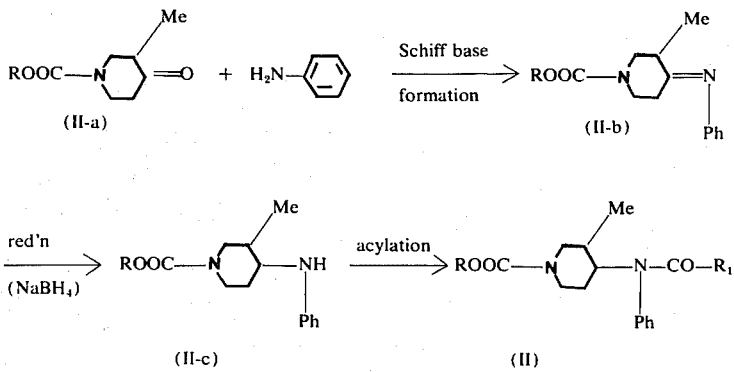

The organic bases of formula (I) may be converted to corresponding pharmaceutically acceptable acid addition salts by reaction with an appropriate acid, e.g., an inorganic acid such as, for example, hydrochloric, hydrobromic, hydriodic, sulfuric, nitric and like acids, or, e.g., an organic acid such as, for example, acetic, propionic, glycolic, lactic, oxalic, malic, malonic, tartaric citric, sulfamic, ascorbic and like acids. In turn, the acid addition salts may readily be converted to the corresponding base forms by conventional treatment with suitable base.

The compounds of formula (I), in base form or more preferably in the form of a pharmaceutically acceptable acid addition salt, are highly potent analgesics, as demonstrated, for example, in experimental animals. According to the rat tail withdrawal test described in ceutical forms for administration purposes. To prepare the pharmaceutical compositions of this invention, an analgesically effective amount of the particular compound, in base or acid-addition salt form, as the active ingredient is combined in intimate admixture with a pharmaceutically acceptable carrier, which carrier may take a wide variety of forms depending on the form of preparation desired for administration. These pharmaceutical compositions are desirable in unitary dosage form suitable, preferably, for administration orally, rectally or by parenteral injection. For example, in preparing the compositions in oral dosage form, any of the usual pharmaceutical media may be employed, such as, for example, water, glycols, oils, alcohols and the like in the case of oral liquid preparations such as suspensions, syrups, elixirs and solutions; or solid carriers such as starches, sugars, kaolin, lubricants, binders, disintegrating agents and the like in the case of powders, pills, capsules and tablets. Because of their ease in administration, tablets and capsules represent the most advantageous oral dosage unit form, in which case solid pharmaceutical carriers are obviously employed. For parenteral compositions, the carrier will usually comprise sterile water, at least in large part, though other ingredients, for example, to aid solubility, ma be included. Injectable solutions, for example, may be prepared in which the carrier comprises saline solution, glucose solution or a mixture of saline and glucose solution. Injectable suspensions may also be prepared in which case appropriate liquid carriers, suspending agents and the like may be employed. Acid addition salts of(I), due to their increased water solubility over the corresponding base form, are obviously more suitable in the preparation of aqueous compositions.

It is especially advantageous to formulate the aforementioned pharmaceutical compositions in dosage unit form for ease of administration and uniformity of dosage. Dosage unit form as used in the specification and claims herein refers to physically discrete units suitable as unitary dosages, each unit containing a predetermined quantity of active ingredient calculated to produce the desired therapeutic effect in association with the required pharmaceutical carrier. Examples of such dosage unit forms are tablets (including scored or coated tablets), capsules, pills, powder packets, wafers, injectable solutions or suspensions, teaspoonfuls, tablespoonfuls and the like, and segregated multiples thereof. The amount of active ingredient per dosage unit will be from about 0.001 mg to about 1 mg, and, preferably, from about 0.003 mg to about 0.1 mg.

The following formulations exemplify typical analgesic pharmaceutical compositions in dosage unit form suitable for administration to animal and human subjects in accordance with the instant invention.

Capsules: 10,000 Hard gelatin capsules, each containing as the active ingredient (A.I.) 0.05 milligrams of cis-(±)-N-(3-methyl-1-phenethyl-4-piperidyl)propionanilide, are prepared from the following formulation:

|  | Grams |
|---|---|
| A.I. | 0.5 |
| Lactose | 999.5 |
| Starch | 250 |
| Talc | 250 |
| Calcium Stearate | 10 |

A uniform mixture of the active and supplementary ingredients is prepared and filled into two-piece hard gelatin capsules.

Tablets: 5,000 Compressed tablets, each containing as the active ingredient 0.1 milligrams of trans-(±)-N-(3-methyl-1-phenethyl-4-piperidyl) propionanilide, are prepared from the following formulation:

|  | Grams |
|---|---|
| A.I. | 0.5 |
| Starch | 75 |
| Dibasic Calcium phosphate hydrous | 549.5 |
| Calcium Stearate | 2.5 |

The finely powdered ingredients are mixed well and granulated with 10% starch paste. The granulation is dried and compressed into tablets using starch as a disintegrant and calcium stearate as a lubricant.

Oral Suspension: The following formulation provides 5 liters of an oral suspension comprising 0.05 mg of cis-(±)-N-(3-methyl-1-phenethyl-4-piperidyl)propionanilide as the active ingredient per teaspoonful (5mls.):

|  | Grams |
|---|---|
| A.I. | 0.05 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A. F. Emulsion | 0.15 |
| Propylene glycol | 52.0 |
| FD&C Yellow No. 5 | 0.1 |
| Sodium cyclamate | 50.0 |
| Sodium saccharin | 5.0 |
| Orange flavor | 7.5 |
| Filtered purified water, q.s., ad 5 liters | |

Dissolve the parabens in the propylene glycol and add this solution to a solution of the sodium cyclamate, sodium saccharin and sucrose in half the water. Suspend the bentonite in hot (about 85°C.) water and stir for 60 minutes. Add the bentonite suspension to the former solution.

Dissolve the sulfosuccinate in some water and dissolve the A.I. in the resulting solution. Add the Antifoam A.F. Emulsion which has been diluted to a lotion consistency with a minimum amount of water and mix well.

Add the latter solution of A.I. to the former mixture and mix well. Add the FD&C Yellow No. 5 dissolved in a small amount of water. Add the orange flavor, q.s. to volume with water, and stir to a homogeneous mixture. Pass the mixture through a colloid mill and fill suitable containers.

Injectable solution: The following formulation provides 1 liter of a parenteral suspension comprising 0.031 mg of trans-(±)-N-(3-methyl-1-phenethyl-4-piperidyl)propionanilide oxalate as the active ingredient per milliliter:

|  | Grams/l |
|---|---|
| A.I. | 0.031 |
| Methyl paraben | 0.250 |
| Propyl paraben | 0.025 |
| Water for Injection, U.S.P., w.s. ad 1 liter | |

Dissolve 25 gr methyl paraben and 2.5 gr propyl paraben in about 20 l water for injection by heating to nearly boiling (95°C). Add to the hot solution (about 80°C) trans-(±)-N-(3-methyl-1-phenethyl-4-piperidyl)propionanilide oxalate (the equivalent of 2.5 gr of the base). After solution is complete, add water for injection to a total volume of 100 liters. Let stand the solution to cool for at least 12 hours, then correct the volume by addition of water for injection. After mixing, sterilize the solution by filtration (U.S.P. XVII p. 811) and fill in sterile containers. Sterilization may also be effected by heat. (U.S.P. XVII p. 810 —20 minutes at 121°C).

Suppository: Hundred suppositories, each containing 0.05 mg of cis-(+)-N-(3-methyl-1-phenethyl-4-piperidyl)propionanilide are prepared from the following formulation:

|  | Grams |
|---|---|
| A.I. | 0.005 |
| Theobroma oil | 50.0 |

Shred or grate the theobroma oil. Pulverize the A.I. and pour on top of the grated theobroma oil in a mortar and stir with spatula until fairly well mixed. Then grind the mixture with a pestle until a mass is formed and cut and shape into suppositories.

Capsules: 10,000 hard gelatin capsules each containing 0.01 mg of cis-(+)-N-(3-methyl-1-phenethyl-4-piperidyl)propionanilide as the active ingredient are prepared according to the following formula. These ingredients are intimately mixed together and placed into two-piece gelatin capsules.

|  | Grams |
|---|---|
| A.I. | 0.1 |
| Lactose | 699.9 |
| Talc | 150 |
| Starch | 150 |
| Calcium Stearate | 10 |

Tablets: 5,000 compressed tablets containing as the active ingredient 0.01 mg of cis-(+)-N-(3-methyl-1-phenethyl-4-piperidyl)propionanilide or a salt thereof as the active ingredient are prepared according to the following formula. The ingredients in fine powder are mixed and granulated with 10% starchpaste. The granules are dried and compressed into tablets.

|  | Grams |
|---|---|
| A.I. | 0.05 |
| Starch | 75 |
| Dibasic Aqueous Calcium-phosphate | 574.95 |
| Calcium Stearate | 3.5 |

The optically inactive compounds of formulas II and II-C, as well as the geometric cis and trans isomers, each free or substantially free of the other, of formulas II, III and IV, and the optically active (+) and (−) isomers of formulas III and IV, again each free or substantially free of its opposite enantiomer, are believed to be novel compounds, and, in view of their utility as precursors in the syntheses heretofore described, such compounds constitute an additional aspect of this invention.

The following examples are intended to illustrate, but not to limit, the scope of the present invention. Unless otherwise stated, all parts are by weight.

EXAMPLE I

A mixture of 32 parts of methyl 3-methyl-4-oxo-1-piperidinecarboxylate, 22 parts of aniline, 160 parts of toluene and a few crystals of p-toluenesulfonic acid is stirred and refluxed for 2 hr. 30 min. using a water-separator. The toluene is evaporated and the residue is distilled, yielding 38 parts of methyl 3-methyl-4-(phenylimino)-1-piperidinecarboxylate; bp. 149–158°C at 0.1–0.4 mm pressure.

To a stirred mixture of 38 parts of methyl 3-methyl-4-(phenylimino)-1-piperidinecarboxylate in 130 parts of methanol are added portionwise 5.3 parts of sodium borohydride at a temperature of 30°C (slightly exothermic reaction). After the addition is complete, the whole is stirred for 1 hour at a temperature of about 50°C. Then there are added about 70 parts of water. The reaction mixture is concentrated to a volume of about 100 parts and the product is extracted with benzene. The extract is dried and evaporated. The oily residue is distilled, yielding (±)-methyl 4-anilino-3-methyl-1-piperidinecarboxylate as a yellow oil.

A mixture of 248.5 parts of (±)-methyl 4-anilido-3-methyl-1-piperidinecarboxylate, 198 parts of propionic anhydride and 1200 parts of toluene is stirred and refluxed overnight to produce (±)-methyl 3-methyl-4-(N-phenylpropionamide)-piperidine-1-carboxylate in situ. The reaction mixture is cooled, alkalized with diluted sodium hydroxide solution, while keeping the temperature below 30°C. The toluene phase is washed twice with water, dried and evaporated. The semi-solid residue of (±)-methyl 3-methyl-4-(N-phenylpropionamide) piperidine-1-carboxylate (formula II) is triturated in 1200 parts diisopropylether, cooled in ice-bath and the product is filtered off, washed with diisopropylether and dried in vacuo, yielding 213.5 parts of products, which is recrystallized twice from a (1:1)mixture of diisopropylether and 2-propanol (filtrates 1 and 2 are set aside), yielding about 56 parts of cis-(±)-methyl 3-methyl-4-(N-phenylpropionamide)piperidine-1-carboxylate; mp. 153°–154.3°C.

The combined filtrates 1 and 2 are evaporated. The residue is crystallized from a (1:1) mixture of diisopropylether and 2-propanol; yielding first at room temperature a fraction of about 42 parts of impure cis-(±)-methyl 3-methyl-4-(N-phenylpropionamide)piperidine-1-carboxylate, and on cooling to 0°C, a second fraction of about 29 parts of impure trans-(±)-methyl 3-methyl-4-N-phenylpropionamide)piperidine-1-carboxylate. The latter fraction is recrystallized from the same solvent-mixture, yielding about 20.5 parts of trans-(±)-methyl 3-methyl-4--N-phenylpropionamide)piperidine-1-carboxylate; mp. 132.5°–134.2°C.

EXAMPLE II

A mixture of 130 parts of cis-(±)-methyl 3-methyl-4-(N-phenylpropionamide)piperidine-1-carboxylate and 750 parts of hydrobromic acid solution 48% is stirred and refluxed for 3 hours. The reaction mixture is cooled and alkalized with sodium hydroxide solution. The free base, cis-(±)-4-anilino-3-methylpiperidine, is extracted with toluene, the extract is dried, filtered and evaporated. The oily residue is distilled; yielding 74 parts of cis-(±)-4-anilino-3-methylpiperidine, bp. 140°–145°C at 0.4 mm pressure, which solidifies on standing at room temperature; mp. 54.6°–56°C.

A mixture of 11.1 parts of phenethylbromide, 11.4 parts of cis-(±)-4-anilino-3-methylpiperidine, 13 parts of sodium carbonate and 0.5 parts of potassium iodide in 400 parts of 4-methyl-2-pentanone is stirred and refluxed for 20 hours. The reaction mixture is filtered several times until clear and the filtrate is evaporated. The oily residue is dissolved in 800 parts of diisopropylether. The solution is treated with activated charcoal, filtered and the filtrate is evaporated again, yielding 16.2 parts of cis-(±)-4-anilino-3-methyl-1-phenethylpiperidine.

A mixture of 15 parts of cis-(±)-4-anilino-3-methyl-1-phenethylpiperidine in 320 parts of toluene is dried azeotropically. After cooling to about 40°C, there are added 13 parts of propionic anhydride and the whole is stirred at reflux temperature overnight. The reaction mixture is cooled, alkalized with ammonium hydroxide solution and the organic layer is separated. The latter is dried, filtered and evaporated. The residue of cis-(±)-N-(3-methyl-1-phenethyl-4-piperidyl)propionanilide is dissolved in acetone and to this solution is added a solution of 6.3 parts of oxalic acid dihydrate in acetone. The crystallized salt is filtered off and recrystallized from 2-propanol, yielding 12 parts of cis-(±)-N-(3-methyl-1-phenethyl-4piperidyl)propionanilide oxalate; mp 163.7°C

EXAMPLE III

A mixture of 20 parts of trans-(±)-methyl 3-methyl-4-(N-phenylpropionamide)piperidine-1-carboxylate and 300 parts of hydrobromic acid solution 48% is stirred and refluxed for 2 hr. 30 min. The reaction mixture is poured onto crushed ice and alkalized with sodium hydroxide solution 60%. The free base, trans-(±)-4-anilino-3-methylpiperidine, is extracted three times with toluene. The combined extracts are dried, filtered and evaporated, yielding 12 parts of trans-(±)-4-anilino-3-methylpiperidine.

A mixture of 11.4 parts of phenethylbromide, 12 parts of trans-(±)-4-anilino-3-methylpiperidine, 8.5 parts of sodium carbonate and 240 parts of 4-methyl-2-pentanone is stirred and refluxed overnight (about 15 hours). The reaction mixture is filtered and the fitrate is evaporated. The residue of trans-(±)-4-anilino-3-methyl-1-phenethylpiperidine is dissolved in acetone and the solution is acidified with an excess of 2-propanol previously saturated with gaseous hydrogen chloride. The precipitated salt is filtered off and dried, yielding 7 parts of trans-(±)-4-anilino-3-methyl-1-phenethylpiperidine dihydrochloride.

From 7 parts of trans-(±)-4-anilino-3-methyl-1-phenethylpiperidine dihydrochloride the free base is liberated with ammonium hydroxide solution. After extraction with toluene, the extract is dried and filtered. The filtrate is dried azeotropically and after cooling to about 40°C, there are added 4.9 parts of propionic anhydride. The whole is stirred at reflux temperature overnight. The reaction mixture is cooled, alkalized with ammonium hydroxide solution and the aqueous phase is extracted with chloroform. The chloroform extract is dried, filtered and evaporated. The residue of trans-(±)-N-(3-methyl-1-phenethyl-4-piperidyl)propionanilide is dissolved in acetone and to this solution is added oxalic acid dihydrate dissolved in acetone. The crystallized oxalate salt is filtered off, dried and recrystallized from 2-propanol, yielding 1.5 parts of trans-(±)-N-(3-methyl-1-phenethyl-4-piperidyl)propionanilide oxalate; mp. 159.9°C

EXAMPLE IV

A mixture of 99 parts of cis-(±)-4-anilino-3-methylpiperidine and 78.15 parts of (+)-tartaric acid is dissolved in a minimal amount of methanol. To this boiling solution is added dimethyl ketone, till turbid. Filtration affords 70 parts of the (+)-tartrate salt of cis-(−)-4-anilino-3-pipecoline, which can be converted to the free base by treatment with alkali (e.g., 50% NaOH).

The filtrate is concentrated in vacuo and the residue is dissolved in water. The solution is alkalized with a 50% sodium hydroxide solution and extracted three times with chloroform. The extracts are dried and evaporated in vacuo. The residue is dissolved in a minimal amount of methanol together with 45.26 parts of (−)-tartaric acid. To this boiling solution is added dimethyl ketone till turbid. Upon cooling, the precipitated (−)-tartrate salt of cis-(+)-4-anilino-3-methylpiperidine is filtered off and converted into the free base with 50% NaOH. After the extraction of the free base with chloroform, the latter is dried and evaporated in vacuo to yield a residue of 33 parts of cis-(+)-4-anilino-3-methylpiperidine; $\alpha$(4% in methanol): +6.1°; m.p. 93.5°–94.5°C.

EXAMPLE V

A mixture of 6.25 parts of phenethylbromide, 5.55 parts of cis-(+)-4-anilino-3-methylpiperidine, 6.5 parts of sodium carbonate, 0.1 parts of potassium iodide and 200 parts of 4-methyl-2-pentanone is stirred and refluxed overnight. The reaction mixture is cooled, filtered and the filtrate is evaporated in vacuo. The residue of cis-(+)-4-anilino-1-phenethyl-3-methylpiperidine is converted into the hydrochloride salt in 2-propanol; a mixture of the mono- and dihydrochloride salt is obtained. The free base is liberated by conventional treatment with alkali (50% NaOH) yielding 5.6 parts of cis-(+)-4-anilino-1-phenethyl-3-methylpiperidine; $\alpha$ (4% in methanol): +44.8°

A mixture of 14.5 parts of cis-(+)-4-anilino-1-phenethyl-3-methylpiperidine, 7.8 parts of propionic and anhydride and 400 parts of toluene is stirred and refluxed overnight (about 15 hours). The reaction mixture is cooled, alkalized and extracted with aqueous ammonia. The organic phase is washed twice with water, dried and evaporated in vacuo. The residue of cis-(+)-N-(3-methyl-1-phenethyl-4-piperidyl)propionanilide is converted into the nitrate salt in diisopropylether. The salt is filtered off and crystallized from a mixture of diisopropylether and 2-propanol, yielding 19 parts of cis-(+)-N-(3-methyl-1-phenethyl-4-piperidyl)propionanilide nitrate isopropyl alcoholate; mp. 95.4°C; $\alpha_{20}^D$ : +0.2°. (2% in methanol).

A mixture of 2.9 parts of cis-(+)-4-anilino-1-phenethyl-3-methylpiperidine, 2.6 parts of propionic anhydride and 200 parts of toluene is stirred and refluxed overnight. The reaction mixture is cooled and water is added. The whole is alkalized with ammonium hydroxide solution and the layers are separated. The aqueous phase is extracted twice with toluene. The combined organic layers are dried, filtered and evaporated in vacuo. The residue is converted into the oxalate salt. The salt is filtered off and crystallized twice from a mixture of diisopropylether and 2-propanol, yielding 1.8 parts of cis (+) N-(3-methyl-1-phenethyl-4-piperidyl)propionanilide oxalate; mp. 105.5°C; α (4% in methanol): +7.04°.

We claim:

1. A method of resolving cis-(±)-4-anilino-3-methylpiperidine which comprises dissolving cis-(±)-4-anilino-3-methylpiperidine with (+)-tartaric acid in a heated lower alkanol, adding a lower alkanone to said heated solution till turbidity occurs, cooling the solution to below 35°C and mechanically separating the insoluble cis-(−)-4-anilino-3-methylpiperidine (+)-tartrate salt.

2. The method of claim 1, wherein said lower alkanol is methanol and said lower alkanone is dimethyl ketone.

3. A method of resolving cis-(±)-4-anilino-3-methylpiperidine which comprises dissolving cis-(±)-4-anilno-3-methylpiperidine with (+)-tartaric acid in a heated lower alkanol, adding a lower alkanone to said heated solution till turbidity occurs, cooling the solution to below 35° C, mechanically separating the insoluble cis-(−)-4-anilino-3-methylpiperidine (+)-tartrate salt, concentrating the mother liguor, neutralizing acid present in an aqueous solution of the thus-obtained residus with alkali, extracting such aqueous solution with chloroform, evaporating the chloroform from said extract, dissolving the residue with (−)-tartaric acid in a heated lower alkanol, adding a lower alkanone to said heated solution till turbidity occurs, cooling the solution to below 35°C and mechanically separating the insoluble cis-(+)-anilino-3-methylpiperidine (−)-tartrate salt.

4. The method of claim 3 wherein said lower alkanol is methanol and said lower alkanone is dimethyl ketone.

5. Cis-(±)-4-anilino-3-methylpiperidine.

6. Trans-(±)-4-anilino-3-methylpiperidine.

7. Cis-(−)-4-anilino-3-methylpiperidine (+)-tartrate.

8. Cis-(−)-4-anilino-3-methylpiperidine.

9. Cis-(+)-4-anilino-3-methylpiperidine (−)-tartrate.

10. Cis-(+)-4-anilino-3-methylpiperidine.

11. Cis-(±)-4-anilino-3-methyl-1-phenethylpiperidine.

12. Trans-(±)-4-anilino-3-methyl-1-phenethylpiperidine.

13. Cis-(+)-4-anilino-3-methyl-1-phenethylpiperidine.

\* \* \* \* \*

UNITED STATES PATENT AND TRADEMARK OFFICE
CERTIFICATE OF CORRECTION

PATENT NO. : 3,907,813  
DATED : September 23, 1975  
INVENTOR(S) : Janssen, Paul Adriaan Jan et al Page 1 of 2

It is certified that error appears in the above-identified patent and that said Letters Patent are hereby corrected as shown below:

In Column 2, line 7, the word (+) or (-) should read --- "(+)"or "(-)" ; ---.

In Column 2, line 13, the word "(+(-and-)" should read --- (+) and (-) ; ---.

In Column 2, line 48, the word "using" should read --- Using ---.

In Column 2, line 59, the word "piperadine" should read --- piperidine; ---.

In Column 3, line 1, the word "R 2" should read --- $R_2$; ---.

In Column 3, line 49, the word "resulution" should read --- resolution; ---.

In Column 4, line 23, the word "(-)", second occurrence, to --(+); ---.

In Column 5, line 12, the word "cis(-)" should read --- cis-(-); ---.

In Column 5, line 21, the word "anilino3" should read --- anilino-3; ---.

In Column line 60, the word "tartaric citric" should read --- tartaric, citric; ---.

In Column 7, line 9, the word "ma be" should read --- may be; ---.

UNITED STATES PATENT AND TRADEMARK OFFICE
CERTIFICATE OF CORRECTION

PATENT NO. : 3,907,813

Page 2 of 2

DATED : September 23, 1975

INVENTOR(S) : Janssen, Paul Adriaan Jan et al

It is certified that error appears in the above-identified patent and that said Letters Patent are hereby corrected as shown below:

In Column 8, line 58, the word "w.s." should read --- q.s.; ---.

In Column 10, line 39, the word "fi-trates" should read --- filtrates; ---.

In Column 11, line 29, the word "4piperidyl" should read --- 4-piperidyl; ---.

Signed and Sealed this twenty-sixth Day of July 1977

[SEAL]

Attest:

RUTH C. MASON
*Attesting Officer*

C. MARSHALL DANN
*Commissioner of Patents and Trademarks*